(12) United States Patent
Lee et al.

(10) Patent No.: US 8,487,283 B1
(45) Date of Patent: Jul. 16, 2013

(54) MULTI-CHANNEL POLARIZED THERMAL EMITTER

(75) Inventors: Jae-Hwang Lee, Chestnut Hill, MA (US); Kai-Ming Ho, Ames, IA (US); Kristen P. Constant, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1285 days.

(21) Appl. No.: 12/288,742

(22) Filed: Oct. 23, 2008

Related U.S. Application Data (60) Provisional application No. 60/999,949, filed on Oct. 23, 2007.

(51) Int. Cl.
*H01L 35/02* (2006.01)
*G01J 3/10* (2006.01)

(52) U.S. Cl.
USPC .................................................. 250/504 R (58) Field of Classification Search
USPC ................................ 250/493.1, 504 R, 503.1
See application file for complete search history.

(56) References Cited

U.S. PATENT DOCUMENTS

| | | | | |
|---|---|---|---|---|
| 6,274,293 | B1 * | 8/2001 | Gupta et al. | 430/315 |
| 7,615,749 | B2 * | 11/2009 | Nishizawa et al. | 250/339.07 |
| 7,820,365 | B1 * | 10/2010 | Williams et al. | 430/311 |
| 2007/0289119 | A1 * | 12/2007 | Lee et al. | 29/592.1 |
| 2010/0294325 | A1 * | 11/2010 | Lee et al. | 136/206 |

OTHER PUBLICATIONS

Lee, J., et al., "Woodpile Metallic Photonic Crystals Fabricated by using Soft Lithography for Tailored Thermal Emission" Adv. Mater. 19, 791-794 (Feb. 19, 2007).*

Zhao, Y. et al., "2-D Terahertz Metallic Photonic Crystals in Parallel-Plate Waveguides" IEEE transactions on Microwave Theory and Techniques, vol. 55, No. 4 (Apr. 2007).*

Wan, J., et al., "Thermal emission by metallic photonic crystal slabs" Appl. Phys. Lett. 89, 041915 (Jul. 28, 2006).*

Lee, J., et al., "Three-dimensional metallic photonic crystals fabricated by soft lithography for midinfrared applications" Applied Physics Letters 88, 181112 (May 3, 2006).*

Hitoshi Sai et al.; Spectral and Thermal Properties of Tungsten Selective Emitters with Rectangular Microcavities for Thermophotovoltaic Generations; 3rd World Conference on Photovoltaic Energy Conversion; May 11-13, 2003; 4 pages, pp. 208-211; Osaka, Japan.

M.U. Pralle et al.; Photonic crystal enhanced narrow-bank infrared emitters; publication; Dec. 16, 2002; 4 pages, pp. 4685-4687 (and copyright notice); vol. 81, No. 25; Applied Physics Letters; 2002 American Institute of Physics.

(Continued)

*Primary Examiner* — Robert Kim
*Assistant Examiner* — Wyatt Stoffa
(74) *Attorney, Agent, or Firm* — Reinhart Boerner Van Deuren P.C.

(57) ABSTRACT

A multi-channel polarized thermal emitter (PTE) is presented. The multi-channel PTE can emit polarized thermal radiation without using a polarizer at normal emergence. The multi-channel PTE consists of two layers of metallic gratings on a monolithic and homogeneous metallic plate. It can be fabricated by a low-cost soft lithography technique called two-polymer microtransfer molding. The spectral positions of the mid-infrared (MIR) radiation peaks can be tuned by changing the periodicity of the gratings and the spectral separation between peaks are tuned by changing the mutual angle between the orientations of the two gratings.

18 Claims, 6 Drawing Sheets
(5 of 6 Drawing Sheet(s) Filed in Color)

OTHER PUBLICATIONS

S. Y. Lin et al.; Three-dimensional photonic-crystal emitter for thermal photovoltaic power generation; publication; Jul. 14, 2003; 4 pages, pp. 380-382 (and copyright notice); vol. 83, No. 2; Applied Physics Letters; 2003 American Institute of Physics.

Jae-Hwang Lee et al.; Woodpile Metallic Photonic Crystals Fabricated by Using Soft Lithography for Tailored Thermal Emission; publication; 2007; 4 pages, pp. 791-794; Advanced Materials; 19; 2007 Wiley-VCH Verlag GmbH & Co. KGaA, Weinheim.

Jae-Hwang Lee et al.; Polarization Engineering of Thermal Radiation Using Metallic Photonic Crystals; publication; 2008; 4 pages, pp. 3244-3247; Advanced Materials; 20; 2008 Wiley-VCH Verlag GmbH & Co. KGaA, Weinheim.

* cited by examiner

MULTI-CHANNEL POLARIZED THERMAL EMITTER

CROSS-REFERENCE TO RELATED PATENT APPLICATIONS

This patent application claims the benefit of U.S. Provisional Patent Application No. 60/999,949, filed Oct. 23, 2007, the teachings and disclosure of which are incorporated in their entireties herein by reference thereto.

STATEMENT REGARDING FEDERALLY SPONSORED RESEARCH AND DEVELOPMENT

This invention was made in part with Government support under Contract Number DE-ACO2-06CH11358 awarded by the Department of Energy. The Government has certain rights in this invention.

BACKGROUND

Mid-infrared (MIR) radiation, in wavelengths from 2 to 10 micrometers is of particular interest for chemical and biological sensing because specific information based on the spectral absorption of MIR due to molecular rotational and vibrational transition is provided. To detect the absorption at a specific wavelength, two different wavelengths are used for reliable sensing where one wavelength is the same as the absorption wavelength and the other wavelength is used for reference. The sensing device requires a tunable MIR source and a spectrometer resulting in a bulky and expensive device.

For MIR radiation, a thermal source is widely used. The radiation spectrum of the thermal source is very broad as it follows Planck's radiation law and is therefore not easy to tune the spectrum without changing the temperature of the source. For detection of specific chemical information, a MIR source with narrow spectral distribution is advantageous to reduce power consumption and reduce background noise. There is a class of artificial micro-structures that can modify the thermal radiation spectrum by enhancing thermal radiation at a certain wavelength. Because the micro-structured thermal sources emit MIR radiation within a narrow range of wavelengths, adjustable by changing the structural parameters, it can be optimized as a MIR source for a specific absorption wavelength.

Thermal radiation can have two orthogonal polarizations and thermal radiation with one polarization that is independent of the thermal radiation of the other polarization. As a result, multiplexing is possible. Moreover, two thermal radiations with different polarizations reflect with different ratios when the incident angle is not normal to the reflecting surface, and this gives additional information for identifying chemical substances. Therefore, polarization engineering of MIR radiation brings additional advantages, in addition to the spectral narrowing of MIR radiation.

Generally, thermal radiation from a thermal source is considered unpolarized or weakly-polarized, which means the two polarizations of thermal radiation are equally distributed. The degree of polarization (DOP), defined by $(P1-P2)/(P1+P2)$, is commonly used to show how much the thermal radiation is polarized, where $P1$ and $P2$ are the radiation powers of the two orthogonal polarizations, respectively. The DOP is 0% for unpolarized radiation and 100% for completely polarized radiation. Under special circumstances, DOP deviates far from 0%. For example, the thermal radiation emitted by flat metals starts with unpolarized radiation for normal emergence and increases in DOP with the angle of emergence, at first slowly, to about 90% percent at grazing emergence. Because the radiation power goes to zero at grazing emergence, it is not suitable for polarized MR radiation in spite of high DOP. The conventional way to produce polarized thermal radiation with reasonable power is to pass the unpolarized thermal radiation through a polarizer, which filters the thermal radiation having unwanted polarization resulting in the wasting of more than half of the power used.

SUMMARY

A good MIR source for chemical sensing should simultaneously satisfy the requirements of high radiation power, narrow spectral distribution, and high DOP. Described herein are, among other things, MIR sources using layer-by-layer metallic photonic crystals, which emit MIR radiation at two different narrow wavelength ranges of MIR radiation with completely different linear polarizations and high emissivity. Additionally, the spectral separation between the emission ranges is adjustable.

The MIR source described herein is a polarized thermal emitter (PTE), and can emit polarized thermal radiation without using a polarizer at normal emergence. In contrast to using a polarizer, the PTEs preferentially emit thermal radiation of certain polarization through their structural anisotropy. For these structures, there is no loss of photons in producing polarized thermal radiation.

The PTE consists of two layers of metallic gratings on a monolithic and homogeneous metallic plate. The PTE in one embodiment is fabricated by a low-cost soft lithography technique called two-polymer microtransfer molding. The spectral positions of the MIR radiation peaks can be tuned by changing the periodicity of the gratings and the spectral separation between peaks are tuned by changing the mutual angle between the orientations of the two gratings.

Other aspects, objectives and advantages will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings incorporated in and forming a part of the specification illustrate several aspects of the present invention and, together with the description, serve to explain the principles of the invention. In the drawings:

FIG. 4a is a color map of the emissivity of the multi-channel polarized thermal emitter of FIG. 3a;

FIG. 4b is a color map of the emissivity of the multi-channel polarized thermal emitter of FIG. 3b;

FIG. 4c is a color map of the emissivity of the multi-channel polarized thermal emitter of FIG. 3c;

FIG. 4d is a set of polar plots of the three major emission peaks for the multi-channel polarized thermal emitter of FIG. 3a with the polar plots shown as circles with fitted curves;

FIG. 4e is a set of polar plots of the three major emission peaks for the multi-channel polarized thermal emitter of FIG. 3b with the polar plots shown as circles with fitted curves;

FIG. 4f is a set of polar plots of the three major emission peaks for the multi-channel polarized thermal emitter of FIG. 3c with the polar plots shown as circles with fitted curves;

FIG. 5a is a linear color map of the calculated polarization-dependent absorptance spectra of the multi-channel polarized thermal emitter of FIG. 3a;

FIG. 5b is a linear color map of the calculated polarization-dependent absorptance spectra of the multi-channel polarized thermal emitter of FIG. 3b;

FIG. 5c is a linear color map of the calculated polarization-dependent absorptance spectra of the multi-channel polarized thermal emitter of FIG. 3c;

FIG. 5d is a color mapping of the electric field strength in a unit cell of the multi-channel polarized thermal emitter of FIG. 3a of the peak labeled P90a in FIG. 4a;

FIG. 5e is a color mapping of the electric field strength in a unit cell of the multi-channel polarized thermal emitter of FIG. 3a of the peak labeled P90b in FIG. 4a;

FIG. 5f is a graph of the calculated polarization angles for the peaks as a function of the mutual angle shown as curves with the measured values (e.g., P90a, P90b, P90c, etc.) as colored marks;

FIG. 6a is a color photograph of a polarized thermal radiation marker made from a multi-channel polarized thermal emitter with a mutual angle of ninety degrees between layers;

FIG. 6b is a graph illustrating the spectra of thermal radiation power of the multi-channel polarized thermal emitter of FIG. 6a;

FIG. 6c is a color graph of the thermal radiation distribution mappings of the multi-channel polarized thermal emitter of FIG. 6a taken at a polarization angle of zero degrees; and FIG. 6d is a color graph of the thermal radiation distribution mappings of the multi-channel polarized thermal emitter of FIG. 6a taken at a polarization angle of ninety degrees.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

The multi-channel polarized thermal emitters described herein can provide linearly polarized thermal emission in multiple channels with high thermal radiation power, a high degree of linear polarization, and wide tunability in polarization status. The multi-channel polarized thermal emitter allows simultaneous control of spectral distribution and polarization of radiation, which has been believed not possible in spontaneous emission such as thermal radiation.

Figure 1:
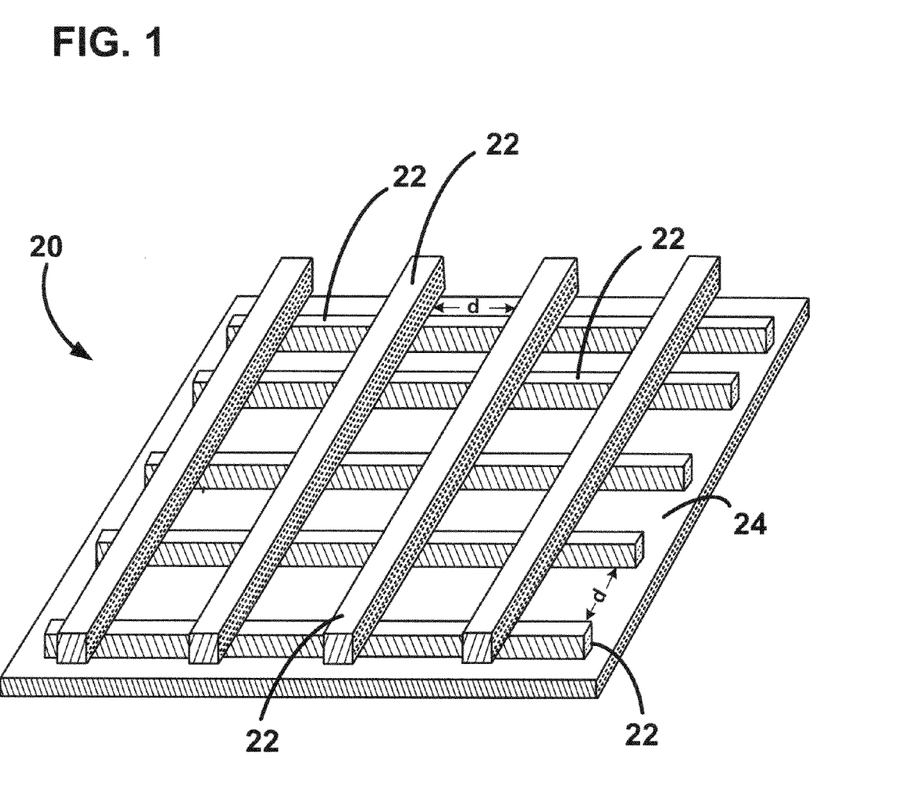
FIG. 1 is a simplified isometric illustration of a two layer photonic crystal on an homogeneous backplane.

Turning now to FIG. 1, in one embodiment, the multi-channel polarized thermal emitter structure 20 has a layer of rods (i.e., gratings) stacked on top of each other with the bottom layer on a homogeneous backplane 24. Each layer of rods consists of an ordered array of parallel rods 22, with a spacing d between rods 22. The axes of each layer are oriented at selected angles (e.g., 30°, 60°, 90°, etc) with respect to adjacent layers. For embodiments that are more than two layers, the alternate layers have their axes parallel to each other with the rods 22 of one layer in offset between the rods 22 of the other layer forming a three-dimensional structure of stacked layers having a four-layer periodicity. The offset between alternate layers in one embodiment is half the spacing d (i.e., d/2).

The multi-channel polarized thermal emitter can be fabricated several ways. One of the ways is by two-polymer microtransfer molding. Turning now to FIGS. 2a-2e, the overall steps to create a multi-channel polarized thermal emitter by two-polymer microtransfer molding is shown. In two-polymer microtransfer molding, a two-layer polymer template is fabricated on a conductive substrate such as indium-tin-oxide (ITO) coated glass and the like (see FIG. 2a). A photo-curable prepolymer (e.g., J91, Summers Optical) is used for the structural material and the ITO layer works as a cathode in electroplating. A commercially available electrodeposition electrolyte kit (e.g., Bright nickel, Caswell) is used without modification for the electrodeposition of nickel (see FIG. 2b). Other methods may be used. An ITO-coated substrate (8-12 ohms, SPI) is sonicated in a water-based detergent for an hour and thoroughly rinsed with distilled water. The template is submerged into the electrolyte in a chamber and the surrounding pressure is subsequently reduced to a level where the electrolyte starts to boil at room temperature and then recovered to atmospheric pressure. After 10 cycles of depressurization, it was observed that the polymer template wets completely. The pressure cycling has two effects: first, release of the captured air in the template by volume expansion; second, depletion of dissolved air in the electrolyte because of lower gas solubility at lower pressure. After wetting occurs, the electroplating is performed at room temperature with a current density 0.15 mA/mm$^2$ until the metal being filled reaches the top of the template.

Figure 2:
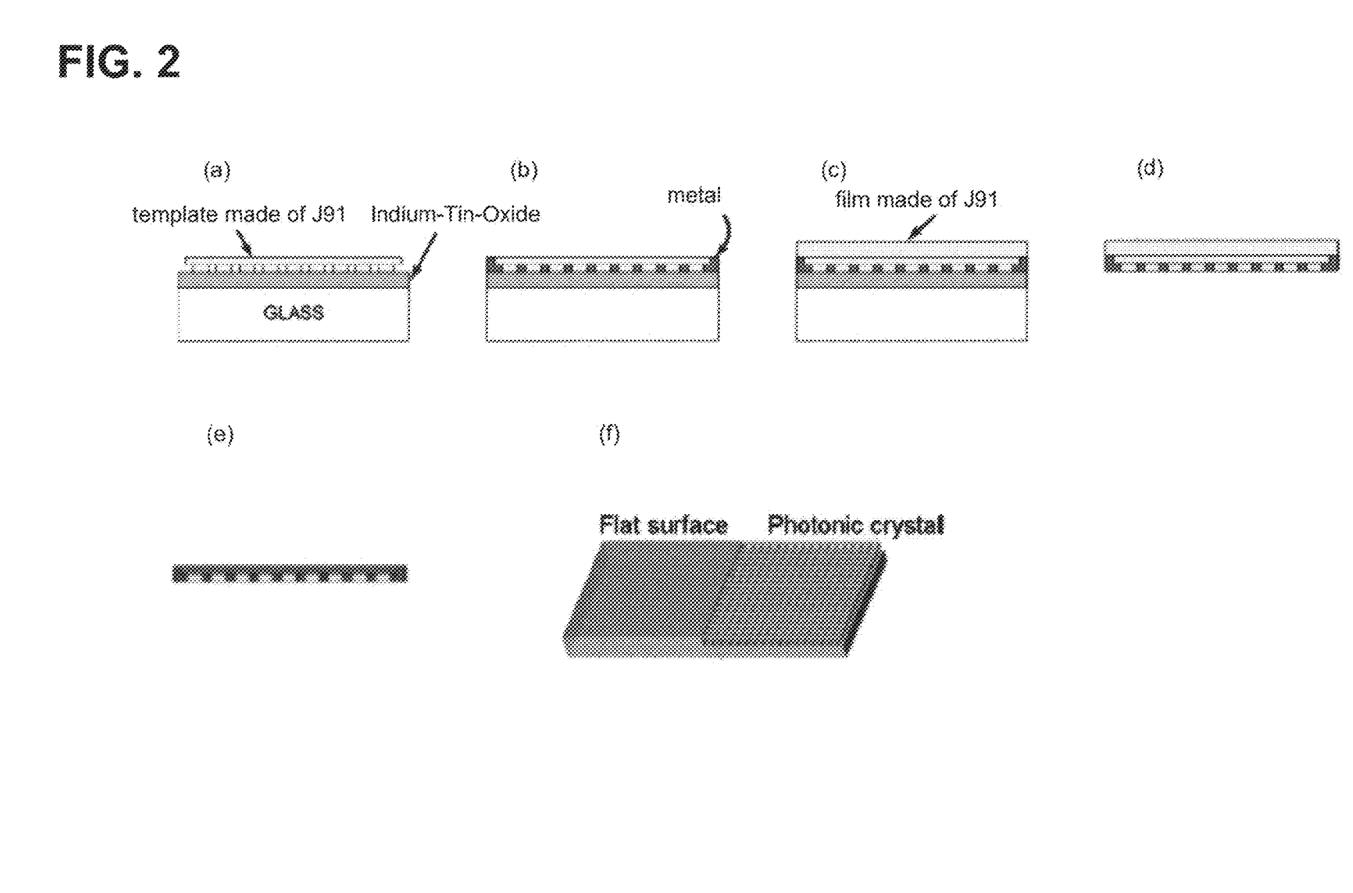
FIG. 2a-2e are isometric illustrations of a portion of the steps of an embodiment to create layer-by-layer metallic photonic structures.
FIG. 2f is an isometric illustration of a metallic photonic crystal on an homogeneous backplane creating a multi-channel polarized thermal emitter

J91 is spun on the metal-infiltrated template at 4000 RPM for 1 minute and is exposed to ultraviolet light (at a wavelength of 366 nm) to solidify it, resulting in the formation of a few tens of microns of homogeneous back-film (see FIG. 2c). The back-film is used to support the metal structure during the step of peeling off the structure from the ITO coated glass. Other methods may be used to provide support if needed. The backfilled template with the back-film is peeled off the ITO coated glass (see FIG. 2d). The homogeneous and thick J91 back-film reinforces the mechanical strength of the template to more easily peel the backfilled template off the ITO coated glass. The polymer template is removed by chemical etching. For example, the peeled film is submerged in potassium hydroxide solution (40% in weight) for 10 minutes to dissolve the template (and the homogeneous back-film) (see FIG. 2e). After rinsing, the structure is dried. Further details on the two-polymer microtransfer molding technique are in U.S. patent application Ser. No. 11/455,486, hereby incorporated by reference in its entirety. Introducing a homogeneous backplane to the backfilled woodpile structure (see FIG. 20 results in the multi-channel polarized thermal emitter. Significant selective enhancement in thermal radiation is achieved from the two-layer structure requiring only coarse alignment. The backplane also provides mechanical reinforcement to improve the durability of the structure.

The resulting structure consists of two layers of metallic gratings on a monolithic and homogeneous metallic plate. The spectral positions of the MIR radiation peaks can be tuned by changing the periodicity of the rods and the spectral separation between peaks is tuned by changing the mutual angle between the orientations of the rod layers.

Figure 3:
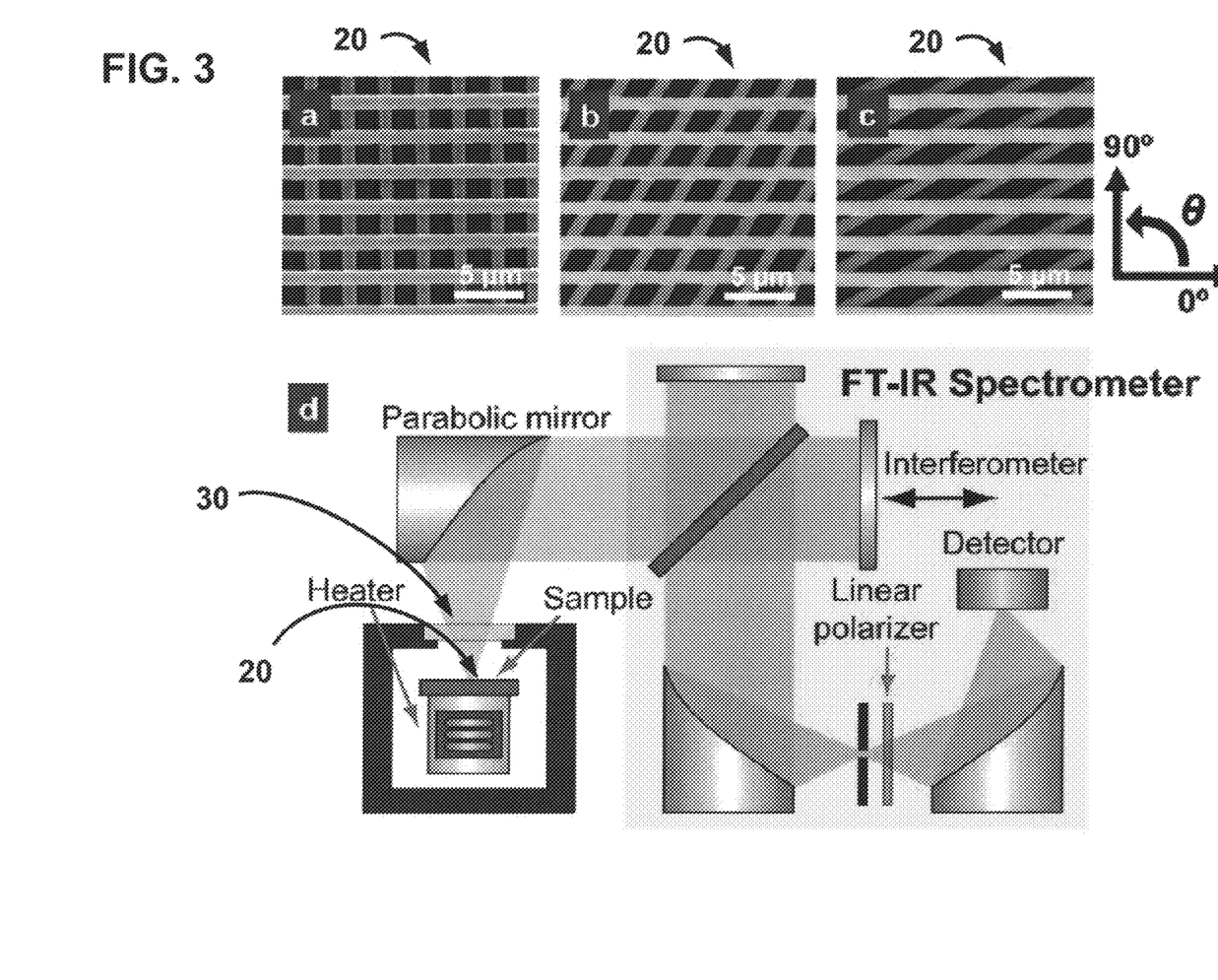
FIG. 3a is a scanning electron micrograph of a multi-channel polarized thermal emitter with a mutual angle of ninety degrees between layers.
FIG. 3b is a scanning electron micrograph of a multi-channel polarized thermal emitter with a mutual angle of sixty degrees between layers.
FIG. 3c is a scanning electron micrograph of a multi-channel polarized thermal emitter with a mutual angle of thirty degrees between layers.
FIG. 3d is a schematic illustration of a radiometric setup used to make measurements of the multi-channel polarized thermal emitter.

Turning now to FIGS. 3a-3d, a nickel metallic photonic crystal with only two layers (as in FIG. 3a) has two highly-enhanced thermal radiation peaks when the homogeneous backplane is added. Two more variations of metallic photonic crystals having mutual angles of 60° and 30° as seen in FIGS. 3b and 3c were fabricated to study polarized thermal radiation. The metallic photonic crystals (MPCs) are designated as 90°-, 60°- and 30°-MPCs, respectively. Measurements were made using the radiometric setup shown in FIG. 3d. The MPC 20 is mounted on a heated copper block in a high vacuum chamber. Thermal radiation is collected at the surface normal angle and directed into a Fourier transform infrared (FT-IR) spectrometer (Magna 760, Nicolet) and then passed through a linear IR polarizer (Spectra-Tech Inc.). In the embodiments shown, the distance between rods is 2.6 μm and each rod is 1.1 μm wide and 1.2 μm high. The transmission axis of the polarizer is set as zero when it is parallel to the top layer of rods of the metallic photonic crystals as depicted to the far right of FIG. 3c. The collection angle is perpendicular to the surface with an acceptance angle of 11°. In the measurements, a sampling area was limited to approximately 1×1 mm².

Polarization-dependent thermal radiation power is measured at 800K as a function of the transmission angle of the polarizer from 0° to 180° in 10° steps. To obtain corresponding emissivities, thermal radiation power from a blackbody is also measured under the same conditions. An assumption was made that that thermal radiation from the blackbody source is completely unpolarized. Turning now to FIGS. 4a-4f, the emissivities of the MPCs with the mutual angles of 90° (FIG. 4a), 60° (FIG. 4b), and 30° (FIG. 4c) are color-mapped at the same scale 0 to 0.8. Polar plots of the three peaks for 90° (FIG. 4d), 60° (FIG. 4e), and 30° (FIG. 40 are shown as colored circles with their fitted curves. The fitting parameters are shown under each label of the peaks. Since the emissivities are measured from 0° to 180°, the values out of the range are extended by the two-fold symmetry. Each radial division is 0.2.

In the emissivity map of the 90°-MPC in FIG. 4a, the two major emission peaks at 3377 cm⁻¹ and 2827 cm⁻¹, which are in the vicinity of the photonic band edge, are differently polarized parallel or perpendicular to the rods. The peaks are labeled with P90a and P90b, where 'a' and 'b' represent their family. The third peak, P90c appears far from the photonic band edge, and its emissivity peak is significantly smaller and broader than P90a and P90b. When changing the mutual angle to 60° and 30° successively (as shown in FIGS. 4b and 4c), which means the bottom layer of each MPC rotates clockwise, the three peaks shift both in polarization angle and in wavelength. Spectroscopically, the peaks in the family 'a' show a relatively small shift less than 4% while the other peaks in the group 'b' and 'c' show larger red-shift up to 11% and 21%, respectively, in changing the mutual angle. In addition, notice that polarization angles of the two major peaks rotate counterclockwise in opposition to the rotation of the bottom layer in FIGS. 4e and 4f. For the three selected peaks of each MPC, polarization-dependent emissivities are polar plotted in FIGS. 4d, 4e, and 4f. By assuming a partial polarization, the measured emissivities are fit with a function of Malus's law, $\epsilon_{MAX} \cos^2(\theta - \delta_{MAX}) + \epsilon_{MIN} \cos^2(\theta - \delta_{MAX} - 90°)$ where $\epsilon_{MAX}$ and $\epsilon_{MIN}$ are the maximum and minimum emissivities at two orthogonal angles, $\delta_{MAX}$ and $\delta_{MAX} - 90°$, respectively. The fitting curves are co-plotted on the polar plots with their parameters shown below. All the polarization-dependent emissivities are fit by these calculations to an excellent degree, clearly demonstrating that the thermal emission is linearly polarized. From the parameters, DOP is calculated, defined by $(\epsilon_{MAX} - \epsilon_{MIN})/(\epsilon_{MAX} + \epsilon_{MIN})$. The peaks in family 'b' show high DOP for all the mutual angles close to 0.5 with high emissivity.

Figure 4:
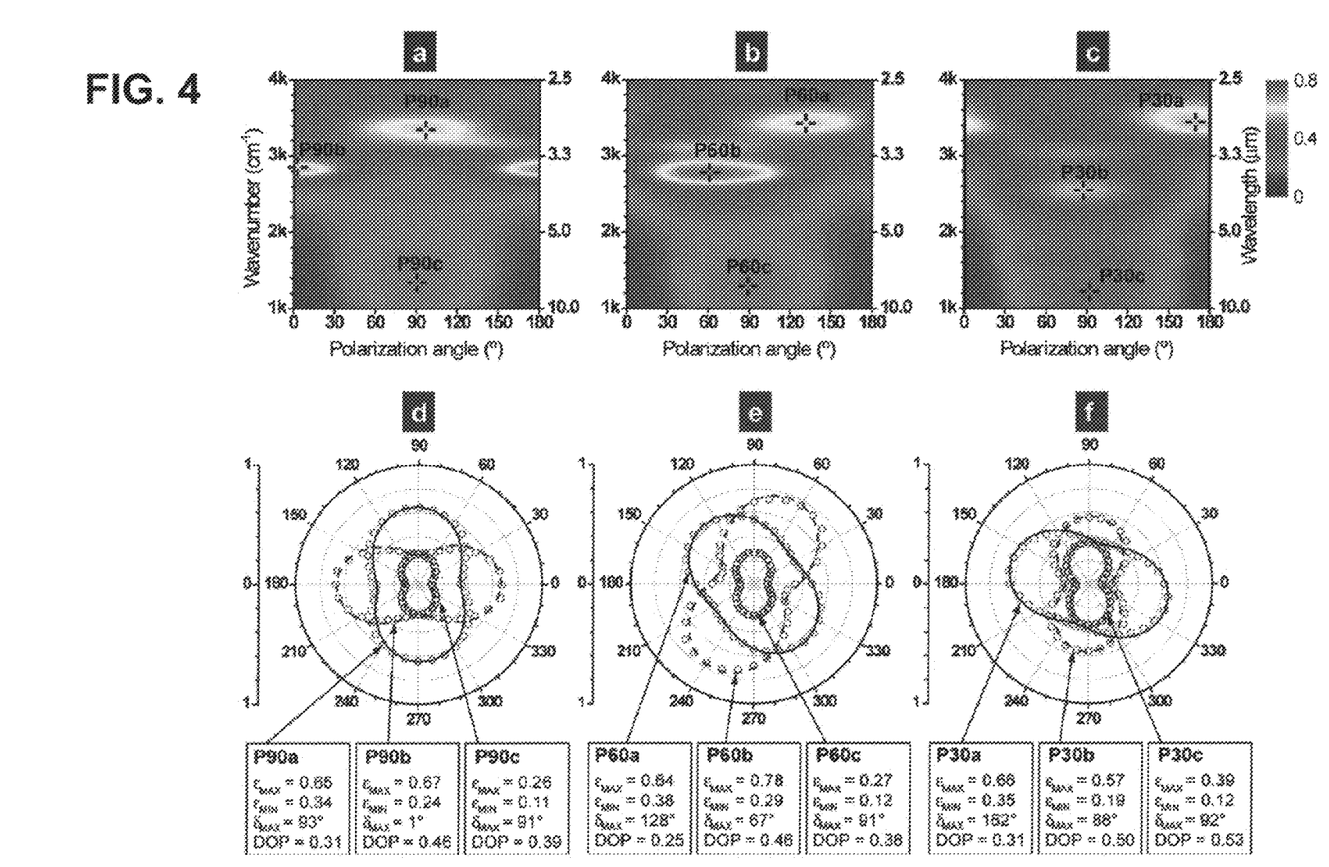
Figure 5:
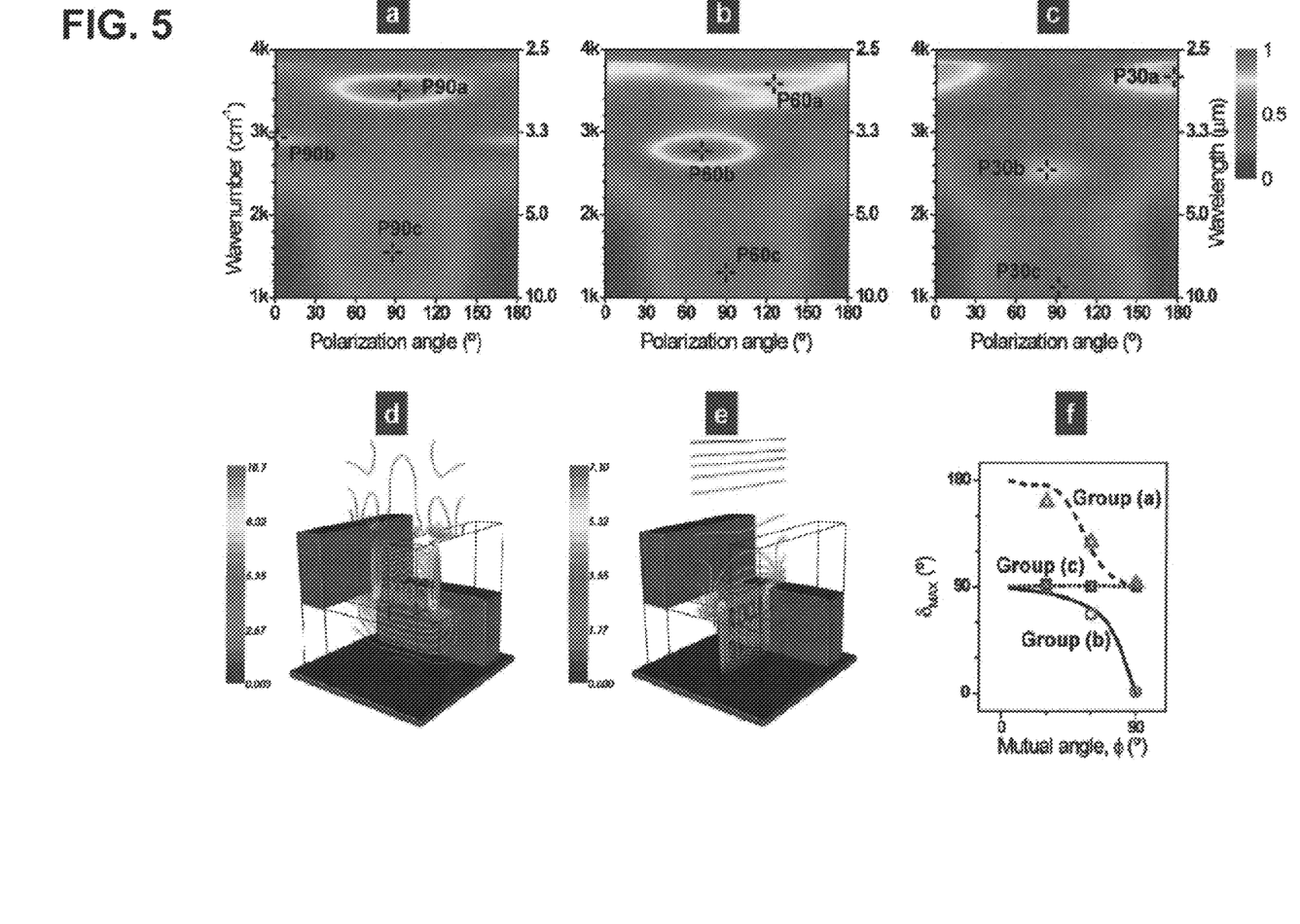

Turning now to FIGS. 5a-5f, numerical simulations for the MPCs are shown. Polarization-dependent absorptance spectra of a 90° MPC (FIG. 5a), a 60° MPC (FIG. 5b), and a 30° MPC (FIG. 5c) are calculated and plotted as linear color maps. Peak positions are marked with the same labels as in FIGS. 4a-4f. The profiles of the electric field strength in a unit cell of a 90° MPC are shown for P90a (FIG. 5d) and P90b (FIG. 5e). The strength is normalized to that of an incoming wave. In FIG. 5f, calculated polarization angles for the peaks as a function of the mutual angle are shown as curves with the measured values as colored marks. According to Kirchhoff's law, absorptance is directly related to emissivity at equilibrium. The excellent agreement with the experimental emissivity spectra in FIG. 4 is demonstrated. The small discrepancies may arise from the fact that the calculation considers only normal incidence while the experiment measures radiation within a finite acceptance angle. We also calculate polarization angles as a function of the mutual angle in FIG. 5f, which is also consistent with the experiment. The negative slope of the families 'a' and 'b' represents that the rotation directions of the structure and polarization angle are opposite.

From the results of the calculation, it was determined that P90a mainly originates from the enhancement of the intrinsic absorption of nickel in the top and bottom layer while P90b is resulted by the whole structure including the backplane. The calculated electric field profiles for P90a and P90b in FIGS. 5d and 5e show the 90°-MPC intensifies the internal electric field 7 to 10 times compared to that of the incoming wave, which suggests that significantly reduced group velocity increases the interaction of light with nickel and enhances the intrinsic absorption. In addition, the difference in the vertical positions of high electric field regions of P90a and P90b in FIGS. 5d and 5e explains why each peak is affected by different parts of the MPC.

Figure 6:
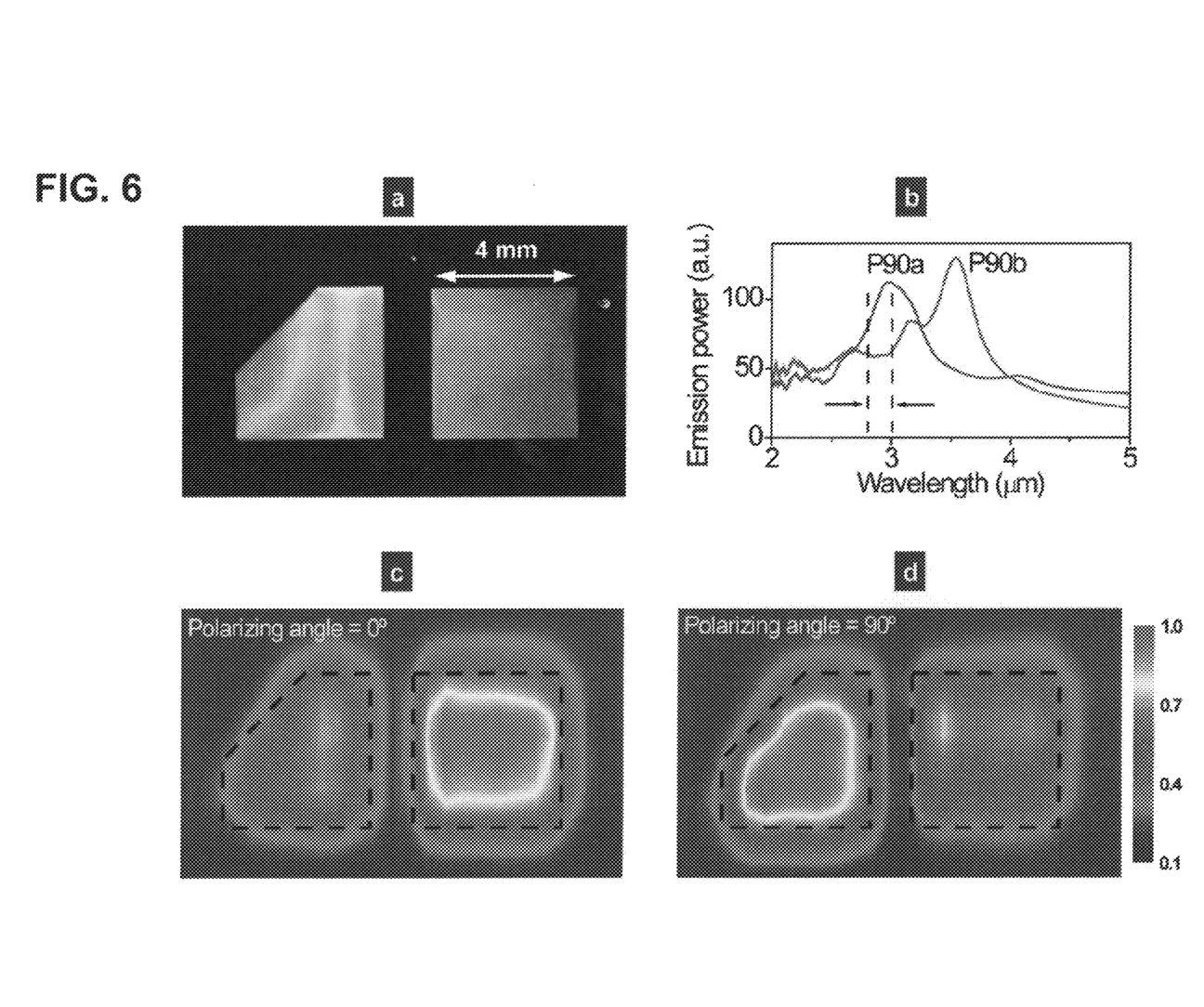

A thermal marker was fabricated to demonstrate a potential application. As shown in FIG. 6a, this consists of two identical 90°-MPCs, one rotated 90° to the other. In the photograph of the thermal marker in FIG. 6a, the dark area surrounding the MPCs is a flat nickel surface. The left MPC was fabricated to have non-square shape for better discrimination in thermal imaging.

Spectra of thermal radiation power of the 90°-MPC for the two orthogonal polarization angles at the same temperature of 800K is shown in FIG. 6b. The dashed lines show the range of wavelength used for the thermal imaging. The high emissivity and DOP of P90a and P90b in FIG. 6b allow the wavelength windows around the two major peaks to be utilized in polarized thermal radiation applications. At the same temperature, the two patterns are clearly distinguishable in the spatial distribution of thermal radiation of FIG. 6c (polarization angle of 0°) and 6d (polarization angle of 90°), which is not possible without a polarizing detector.

In the preceding description, the measurement system of FIG. 3d was calibrated using a blackbody source, which had an emissivity higher than 0.99, at two different temperatures. A home-built blackbody source was used to secure a radiation angle greater than 11°. The blackbody source is a copper block having a spherical cavity of 100 mm diameter and 10 mm exit opening. The entire inner surface is coated with carbon black and exhibits the same thermal radiation power as that of a commercial blackbody source (M335, Mikron Infrared, Inc.). Because the measured thermal radiation spectrum, L' (T, λ) (T=temperature, λ=wavelength), included radiation from the surroundings reflected at the sample surface, $L_0(\lambda)$, and the optical effect from the potassium bromide window 30 in FIG. 3a in the measurement of surface normal radiation, the spectral emissivity of the sample, e(T,k), can be estimated from the following approximation:

$$L'(T,\lambda) \approx T_\omega \epsilon(T,\lambda) L_{BB}(T,\lambda) + T_\omega^2 [1-\epsilon(T,\lambda)] L_0 \lambda$$

where $L_{BB}$ and $L_0$ are the radiation powers from the blackbody at temperature T and from the surroundings, respectively, and $T_w$ is the transmittance of the optical window. The approximation is valid because the transmittance of the sample is zero because of the homogeneous backplane and the reflection from the sample is considered as specular for the near room-temperature background radiation in which nearly all spectral power lies above the diffraction limit of the MPC (2.6 μm). For the thermal images in FIGS. 6c and 6d, thermal radiation from a sample is collected at different 13×8 points with a spacing of 1 mm, same as the spatial resolution of the radiometry setup. Acquired thermal radiation powers within a given spectral window are averaged and normalized to reconstruct the spatial distribution of thermal radiation. With respect to numerical simulations, all calculations are based on a plane-wave-based transfer-matrix-method. The absorptance maps in FIG. 5a, b, and c are calculated by subtracting calculated reflectance and transmittance from unity. For realistic calculations, experimentally-acquired optical constants of nickel are used for the absorptance maps while optical parameters for nickel in the handbook by Lynch, D. W., Hunter W. R. "Nickel (Ni)" in *Handbook of Optical Constants of Solid*, Palik, E. D. ed. (Academic, London, 1985) are used for the electric field profiles in FIGS. 6d and e.

Now that the multi-channel polarized thermal emitter has been described, a comparison of the performance of thermal emitters in three parameters: radiation power, spectral distribution and DOP can be made. Since the structure described herein is unique, direct comparison of performance in all aspects is not directly possible but general comparisons can be made. First, the radiation power can be compared by emissivity, the ratio of the radiation power of thermal emitter to that of a blackbody (perfect emitter). The width of a peak can be scaled by a quality factor, defined by a ratio of spectral position of the peak to the full-width-at-half-maximum of the peak. And DOP is used as index of degree-of-polarization. As summarized in the table, the multi-channel polarized thermal emitter demonstrates high performance in all three categories. Moreover, the unique two-channel radiation with different polarization makes the polarized thermal emitter useful for MIR source for chemical sensing.

| | Number of tunable peaks | Emissivity (%) | Spectral width (λ/Δλ) | DOP (%) |
|---|---|---|---|---|
| Flat metal | No tunable peak | <5% | | 20% at 40° 48% at 60° |
| Tungsten photonic crystal (described in C. H. Seager et al., Appl. Phys. Lett. 86, 244105 (2005)) | Single tunable peak | ~80% | 5.2/1.6 = 3.25 (T = 546K) | n/a |

-continued

| | Number of tunable peaks | Emissivity (%) | Spectral width (λ/Δλ) | DOP (%) |
|---|---|---|---|---|
| Nano-emitter (S. Ingvarsson et al., Opt. Exp. 15, 11249 (2007)) | No tunable peak | n/a ( est. ~10% ) | n/a | 48% at 0° |
| Multi-Channel PTE | Peak 1 | 64~65% | 3.75 (T = 800K) | 25~31% at 0° |
| | Peak 2 | 57~78% | 4.72 (T = 800K) | 46~50% at 0° |

From the foregoing, it can be seen that the MPC can enhance thermal radiation in the vicinity of its photonic band edge with a preferred polarization. As the polarized thermal radiation does not rely on angle sensitive phenomena such as refraction or diffraction, it can be used at a wide range of viewing angles and is scalable for different working wavelengths. The tailorability of polarization characteristics of thermal radiation makes possible advanced applications using polarized IR sources in sensing, security and energy science. It should be noted that unaligned three- or four-layer MPC structures can be useful for tuning the characteristics of thermal radiation because of the existence of universal peaks in the unaligned structures.

By introducing a homogeneous backplane to the woodpile structure, significant selective enhancement in thermal radiation is achieved from a two-layer structure requiring only coarse perpendicular alignment. This backplane also provides mechanical reinforcement to improve the durability of the structure.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The description of various embodiments of the invention has been presented for purposes of illustration and description. It is not intended to be exhaustive or to limit the invention to the precise embodiments disclosed. Variations of those preferred embodiments may become apparent to those of ordinary skill in the art upon reading the foregoing description. For example, one can envision a multi-color IR emitter and polarization-selective IR absorbers as the two emission or absorption wavelengths are selectable using an additional polarizer with the multi-channel polarized thermal emitter described herein. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polarized thermal emitter (PTE), comprising:
a homogeneous backplane;
a metallic photonic crystal positioned on the backplane, the metallic photonic crystal having a first grating layer oriented along a first axis and a second grating layer positioned on the first grating layer oriented along a second axis; and
wherein the metallic photonic crystal emits mid-infrared (MIR) radiation at two different linear polarizations when supplied with un-polarized thermal radiation; and
wherein a mutual angle exists between the first axis and the second axis, and wherein the mutual angle is selected to vary spectral separation between peaks of the MIR radiation emitted therethrough.

2. The PTE of claim 1, wherein each of the grating layers includes a plurality of parallel rods having a periodicity, and wherein the periodicity is selected to vary spectral positions of peaks of the MIR radiation emitted therethrough.

3. The PTE of claim 1, wherein each of the grating layers includes a plurality of parallel rods having a periodicity, and wherein the periodicity is selected to vary spectral positions of the peaks of the MIR radiation emitted therethrough.

4. The PTE of claim 1, wherein the first axis and the second axis are angularly displaced from one another by 60°.

5. The PTE of claim 1, wherein the MIR radiation is emitted at two different narrow wavelength ranges.

6. The PTE of claim 1, wherein the metallic photonic crystal emits MIR radiation at two different linear polarizations and high emissivity when supplied with un-polarized thermal radiation.

7. The PTE of claim 1, further comprising a third grating layer positioned on the second grating layer oriented along the first axis and a fourth grating layer positioned on the third grating layer oriented along the second axis.

8. The PTE of claim 7, wherein each of the grating layers comprise a plurality of parallel rods having a periodicity, wherein the rods of the first grating layer and the third grating layer are offset from one another, and wherein the rods of the second grating layer and the fourth grating layer are offset from one another, such that the metallic photonic crystal has a four-layer periodicity.

9. The PTE of claim 8, wherein the rods of each grating layer are spaced a distance from one another, and wherein the offset is half of the distance.

10. The PTE of claim 1, wherein the homogeneous backplane is a monolithic and homogeneous metallic plate.

11. The PTE of claim 1, wherein the metallic photonic crystal is a nickel metallic photonic crystal.

12. A polarized thermal emitter (PTE), comprising:
a homogeneous backplane,
a metallic photonic crystal positioned on the backplane, the metallic photonic crystal having a first grating layer oriented along a first axis and a second grating layer positioned on the first grating layer oriented along a second axis;
wherein the metallic photonic crystal emits mid-infrared (MIR) radiation at two different linear polarizations when supplied with un-polarized thermal radiation;
wherein the first axis and the second axis are angularly displaced from one another; and
wherein the first axis and the second axis are angularly displaced from one another by 30°.

13. A polarized thermal emitter (PTE), comprising:
a homogeneous backplane;
a metallic photonic crystal positioned on the backplane, the metallic photonic crystal having a first grating layer oriented along a first axis and a second grating layer positioned on the first grating layer oriented along a second axis;
wherein the metallic photonic crystal emits mid-infrared (MIR) radiation at two different linear polarizations when supplied with un-polarized thermal radiation;
wherein the first axis and the second axis are angularly displaced from one another; and
wherein the first axis and the second axis are angularly displaced from one another by 60°.

14. A method of tuning characteristics of mid-infrared (MIR) radiation emitted by a polarized thermal emitter (PTE) having a homogeneous backplane and a metallic photonic crystal positioned on the backplane, the metallic photonic crystal having a first grating layer oriented along a first axis and a second grating layer positioned on the first grating layer oriented along a second axis, constructed such that the metallic photonic crystal emits MIR radiation at two different linear polarizations when supplied with un-polarized thermal radiation, the method comprising the step of:
defining a mutual angle between the first axis and second axis; and
varying the mutual angle to vary a spectral separation between peaks of the MIR radiation.

15. The method of claim 14 wherein each of the grating layers includes a plurality of parallel rods having a periodicity, further comprising the step of varying the periodicity of the rods of the grating layers to vary spectral positions of peaks of the MIR radiation.

16. The method of claim 14, wherein the step of varying the mutual angle comprises the step of setting the mutual angle to 90°.

17. A method of tuning characteristics of mid-infrared (MIR) radiation emitted by a polarized thermal emitter (PTE) having a homogeneous backplane and a metallic photonic crystal positioned on the backplane, the metallic photonic crystal having a first grating layer oriented along a first axis and a second grating layer positioned on the first grating layer oriented along a second axis, the first axis and the second axis defining a mutual angle therebetween, constructed such that the metallic photonic crystal emits MIR radiation at two different linear polarizations when supplied with un-polarized thermal radiation, the method comprising the step of:
varying the mutual angle to vary a spectral separation between peaks of the MIR radiation wherein the step of varying the mutual angle comprises the step of setting the mutual angle to 30°.

18. A method of tuning characteristics of mid-infrared (MIR) radiation emitted by a polarized thermal emitter (PTE) having a homogeneous backplane and a metallic photonic crystal positioned on the backplane, the metallic photonic crystal having a first grating layer oriented along a first axis and a second grating layer positioned on the first gratin layer oriented along a second axis, the first axis and the second axis defining a mutual angle therebetween, constructed such that the metallic photonic crystal emits MIR radiation at two different linear polarizations when supplied with un-polarized thermal radiation, the method comprising the step of:
varying the mutual angle to vary a spectral separation between peaks of the MIR radiation, wherein the step of varying the mutual angle comprises the step of setting the mutual angle to 60°.

* * * * *

UNITED STATES PATENT AND TRADEMARK OFFICE
CERTIFICATE OF CORRECTION

| | |
|---|---|
| PATENT NO. | : 8,487,283 B1 |
| APPLICATION NO. | : 12/288742 |
| DATED | : July 16, 2013 |
| INVENTOR(S) | : Jae-Hwang Lee et al. |

It is certified that error appears in the above-identified patent and that said Letters Patent is hereby corrected as shown below:

Delete the title page and substitute therefore with the attached title page showing the corrected number of claims in patent.

In the Claims

Column 9, lines 31-34
Please cancel claim 3.

Claim 4
Column 9, Line 36, after the word "another by" delete "60°" and insert --90°--.

Signed and Sealed this
Twenty-fourth Day of December, 2013

Margaret A. Focarino
*Commissioner for Patents of the United States Patent and Trademark Office*

(12) United States Patent
Lee et al.

(10) Patent No.: US 8,487,283 B1
(45) Date of Patent: Jul. 16, 2013

(54) MULTI-CHANNEL POLARIZED THERMAL EMITTER (75) Inventors: Jae-Hwang Lee, Chestnut Hill, MA (US); Kai-Ming Ho, Ames, IA (US); Kristen P. Constant, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 1285 days.

(21) Appl. No.: 12/288,742

(22) Filed: Oct. 23, 2008

Related U.S. Application Data (60) Provisional application No. 60/999,949, filed on Oct. 23, 2007.

(51) Int. Cl.
*H01L 35/02* (2006.01)
*G01J 3/10* (2006.01)

(52) U.S. Cl.
USPC .................................................. 250/504 R (58) Field of Classification Search
USPC .................. 250/493.1, 504 R, 503.1
See application file for complete search history.

(56) References Cited

U.S. PATENT DOCUMENTS

| | | | |
|---|---|---|---|
| 6,274,293 B1 * | 8/2001 | Gupta et al. | 430/315 |
| 7,615,749 B2 * | 11/2009 | Nishizawa et al. | 250/339.07 |
| 7,820,365 B1 * | 10/2010 | Williams et al. | 430/311 |
| 2007/0289119 A1 * | 12/2007 | Lee et al. | 29/592.1 |
| 2010/0294325 A1 * | 11/2010 | Lee et al. | 136/206 |

OTHER PUBLICATIONS

Lee, J., et al., "Woodpile Metallic Photonic Crystals Fabricated by using Soft Lithography for Tailored Thermal Emission" Adv. Mater. 19, 791-794 (Feb. 19, 2007).*

Zhao, Y. et al., "2-D Terahertz Metallic Photonic Crystals in Parallel-Plate Waveguides" IEEE transactions on Microwave Theory and Techniques, vol. 55, No. 4 (Apr. 2007).*

Wan, J., et al., "Thermal emission by metallic photonic crystal slabs" Appl. Phys. Lett. 89, 041915 (Jul. 28, 2006).*

Lee, J., et al., "Three-dimensional metallic photonic crystals fabricated by soft lithography for midinfrared applications" Applied Physics Letters 88, 181112 (May 3, 2006).*

Hitoshi Sai et al.; Spectral and Thermal Properties of Tungsten Selective Emitters with Rectangular Microcavities for Thermophotovoltaic Generations; 3rd World Conference on Photovoltaic Energy Conversion; May 11-13, 2003; 4 pages, pp. 208-211; Osaka, Japan.

M.U. Pralle et al.; Photonic crystal enhanced narrow-bank infrared emitters; publication; Dec. 16, 2002; 4 pages, pp. 4685-4687 (and copyright notice); vol. 81, No. 25; Applied Physics Letters; 2002 American Institute of Physics.

(Continued)

*Primary Examiner* — Robert Kim
*Assistant Examiner* — Wyatt Stoffa
(74) *Attorney, Agent, or Firm* — Reinhart Boerner Van Deuren P.C.

(57) ABSTRACT

A multi-channel polarized thermal emitter (PTE) is presented. The multi-channel PTE can emit polarized thermal radiation without using a polarizer at normal emergence. The multi-channel PTE consists of two layers of metallic gratings on a monolithic and homogeneous metallic plate. It can be fabricated by a low-cost soft lithography technique called two-polymer microtransfer molding. The spectral positions of the mid-infrared (MIR) radiation peaks can be tuned by changing the periodicity of the gratings and the spectral separation between peaks are tuned by changing the mutual angle between the orientations of the two gratings.

17 Claims, 6 Drawing Sheets
(5 of 6 Drawing Sheet(s) Filed in Color)